United States Patent
Keys

(10) Patent No.: US 9,092,277 B2
(45) Date of Patent: Jul. 28, 2015

(54) METHOD, APPARATUS, SYSTEM, AND COMPUTER READABLE MEDIUM FOR UNIVERSAL DEVICE PARTICIPATION IN BUSINESS PROCESS AND WORKFLOW APPLICATION

(75) Inventor: Gregory C. Keys, Warwick, NY (US)

(73) Assignees: RICOH COMPANY, LTD., Tokyo (JP); RICOH AMERICAS CORPORATION, West Caldwell, NJ (US)

(*) Notice: Subject to any disclaimer, the term of this patent is extended or adjusted under 35 U.S.C. 154(b) by 575 days.

(21) Appl. No.: 12/874,381

(22) Filed: Sep. 2, 2010

(65) Prior Publication Data

US 2012/0060156 A1   Mar. 8, 2012

(51) Int. Cl.
*G06F 9/46* (2006.01)
*G06F 9/54* (2006.01)

(52) U.S. Cl.
CPC .......... *G06F 9/541* (2013.01); *G06F 2209/541* (2013.01)

(58) Field of Classification Search
None
See application file for complete search history.

(56) References Cited

U.S. PATENT DOCUMENTS

| | | | |
|---|---|---|---|
| 2007/0174693 A1* | 7/2007 | Gerber | 714/15 |
| 2009/0282417 A1* | 11/2009 | Yoshida | 718/104 |
| 2010/0082821 A1* | 4/2010 | Rosenblatt et al. | 709/228 |
| 2010/0197326 A1* | 8/2010 | Ngo | 455/466 |

OTHER PUBLICATIONS

U.S. Appl. No. 12/874,375, filed Sep. 2, 2010, Keys.
U.S. Appl. No. 12/853,910, filed Aug. 10, 2010, Keys.

* cited by examiner

*Primary Examiner* — Mengyao Zhe
(74) *Attorney, Agent, or Firm* — Oblon, McClelland, Maier & Neustadt, L.L.P.

(57) ABSTRACT

A method, apparatus, system, and computer readable medium for hosting an application participating in a workflow communication which generates a workflow step and translates the workflow step into a device instruction, the device instruction being based on device specifications and instructing the device to perform a function. The device instruction is sent to the device and feedback is received from the device, the feedback corresponding to the device instruction. The feedback is then processed and the workflow communication is updated based on the processed feedback.

16 Claims, 5 Drawing Sheets

METHOD, APPARATUS, SYSTEM, AND COMPUTER READABLE MEDIUM FOR UNIVERSAL DEVICE PARTICIPATION IN BUSINESS PROCESS AND WORKFLOW APPLICATION

CROSS-REFERENCE TO RELATED APPLICATIONS

The present application is related to U.S. patent application Ser. No. 12/874,375, filed Sep. 2, 2010, and U.S. patent application Ser. No. 12/853,910, filed Aug. 10, 2010, the entire subject matter of which are incorporated herein by reference.

BACKGROUND

1. Field of the Invention

The present disclosure relates to workflow communication between a device and a workflow application.

2. Description of the Related Art

A "workflow" generally relates to an automated process during which information, usually in the form of documents, or tasks are communicated from one participant to another, based on some trigger, for their action set forth by a set of procedural rules. A "workflow application" is a computer software or online-based program that is used to more efficiently manage all or part of a process that would otherwise not be automated. A process is usually business-related, but it may be any process that requires a series of steps that can be automated via software. Some steps of the process may require human intervention, such as an approval or the development of custom text, but functions that can be automated may be handled by the application.

Existing devices that participate in workflow applications are not universal. In other words, the computer code on the device is designed specifically to communicate with the computer code at the workflow application. Changing one would require changing the other.

Furthermore, many existing devices that participate in workflow operations do not involve multi-step communication between the device and the workflow application. In these cases, there may be one communication from device to workflow application and multiple steps subsequently at the workflow application.

SUMMARY

The features of the present disclosure differ from the features of a web browser-web application (WBWA). For example, unlike the WBWA, the features of the present disclosure do not require human intervention or a user interface, but may allow them. The present disclosure allows embodiments of a wide diversity of devices, such as, but not limited to, embedded chemical sensors, medical devices, copiers, printers, home electrical appliances, smart phones, or the like. Further, the device operations are defined by a device's manufacturer, or the like, and can represent a wide range of operations. For example, for a personal computer (PC), operations may include operation on PC file system (i.e., copy, move, or delete files), reboot PC, change settings on PC, or the like. Specialized devices such as a diabetes monitor, for example, may be able to perform device operations specific to the device (i.e., measure glucose levels of blood). In addition, the device participating language (DPL) may be any machine-readable language and messaging may follow any model, such as asynchronous messaging, broadcast messaging, or the like.

The features of the present disclosure also differ from the features of universal plug and play (UPnP) devices. For example, unlike UPnP, the features of the present disclosure do not involve broadcasting description of a device to specific nodes in the network (called control points), or discovery of a device by control points. In addition, the features of the present disclosure may conform to a client-server model where the device is the server, may conform to a client-server model with the device as the client, and my conform to asynchronous messaging models or other messaging models. Furthermore, the aforementioned features may allow for human interaction with a device, whereas UPnP devices do not involve human interaction, but rather involve instructions sent from a computer to a device, wherein the computer may involve human interaction to generate the instructions.

According to the present disclosure, a device may participate in any workflow application that is written in conformity to the specifications of the device, and may participate in workflows that require operational capabilities greater than the operations capabilities of the device. In addition, a device does not require executable code specific to a particular workflow application, and both a device and a workflow application do not require knowledge of technical implementation details of each other. Accordingly, technical implementations may change on either the device or the workflow application without requiring change on the other side in order to participate in a workflow.

The present disclosure describes a method, apparatus, system, and computer readable medium for hosting an application participating in a workflow communication which generates a workflow step and translates the workflow step into a device instruction, the device instruction being based on device specifications and instructing the device to perform a function. The device instruction is sent to the device and feedback is received from the device, the feedback corresponding to the device instruction. The feedback is then processed and the workflow communication is updated based on the processed feedback.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

The present disclosure is related to peripheral devices acting as universal participants in multi-step workflow applications. A workflow application may represent any application that manages a multi-step process, such as those more commonly experienced as business processes and workflows. A workflow application is also known as a business process management (BPM) application.

Figure 1:
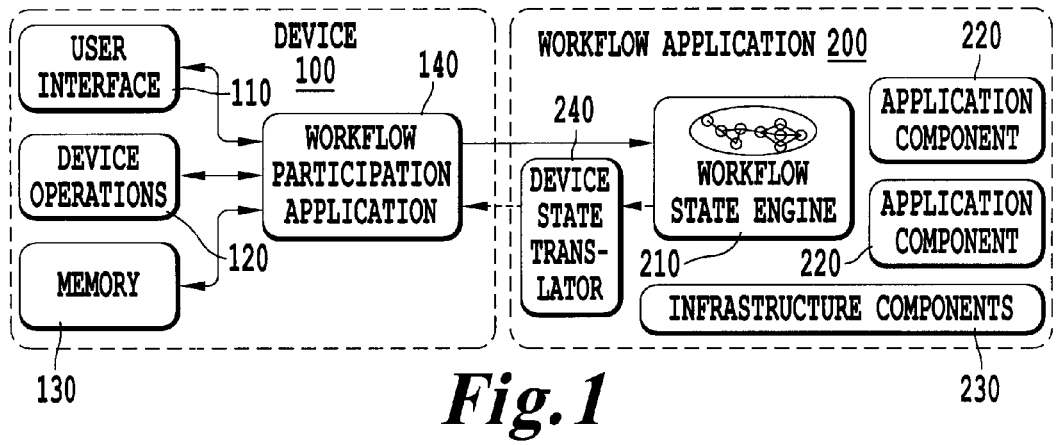
FIG. 1 shows an embodiment of the present disclosure.

FIG. 1 shows the components of an embodiment of the present disclosure. A device 100 may include a user interface 110, device operation(s) 120, a memory 130, and a workflow participation component 140. According to the present disclosure, the device 100 participates in the workflow in a unique way. Specifically, the device 100 is blind in that it receives and sends instructions based on what the workflow application instructs. A device 100 may communicate with a workflow application 200 through a physical or wireless connection, without requiring a specific communication protocol (i.e., Hypertext Transfer Protocol (HTTP)), or a specific messaging model (i.e., client-server, asynchronous messaging, or the like). The communication is generally performed between the device's workflow participation component 140 and the workflow application's workflow state engine 210 and device state translator 240. Furthermore, as explained below, the communication may be triggered by an event, such as an input by a user on the user interface 110 or the like.

The workflow application 200 may include a workflow state engine 210, application component(s) 220, infrastructure component(s) 230, and a device state translator 240. The workflow state engine 210 manages state and state transitions of the workflow application 200, and communicates with other workflow applications (i.e., databases, file systems, user directories, third party components such as credit rating services, banking systems, or the like). The workflow state engine 210 triggers the device state translator 240 to translate the next workflow step into machine readable instructions tailored to a device, such as device 100. The workflow state engine 210 may be, for example, an open source implementation (e.g., Java's openWFE or Open Business Engine), or a proprietary implementation (e.g., IBM® Websphere Process Server or Microsoft® Windows Workflow Foundation). The workflow application 200 components may be hosted on the same host (i.e., a single server, a personal computer (PC), or the like), or may be distributed across a network (i.e., an enterprise network) at various positions in relation to firewalls, subnets, or the like.

A device's workflow participation component 140 communicates with a workflow state engine 210 component by way of a communication component. The device's workflow participation component 140 communicates with a device's user interface 110, device's operation(s) 120, and a device's memory 130. In one embodiment either a user interface 110 or operation(s) 120 may be present. In another embodiment, both may be present. When both are present in a device 100, the user interface 110 and device operation(s) 120 may communicate.

A device's user interface 110 allows user input to a device 100. Any type of input (i.e., text, voice, chemical, biometric, or the like) may be used with the various embodiments of the present disclosure.

Device operation(s) 120 allow(s) non-user inputs into and outputs out of a system and internal triggers of a system. Such operations may be device-specific. For example, an input may be chemical (i.e., blood sample, environmental atmosphere sample, radiation level, or the like). Output examples may include sound (i.e., alarms, machine-generated human voice, printed documents, etc.). Internal trigger examples may include response to device energy level, device supply level (i.e., toner level of copy machine, or the like), device diagnostics, or the like.

Device memory 130 is used by the device's workflow participation component 140 similar to the way a software application uses memory.

Figure 2:
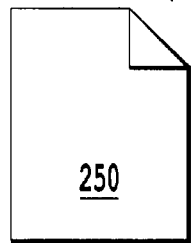
FIG. 2 shows a Device Participation Specification (DPS)

A device 100 has a Device Participation Specification (DPS) 250, shown in FIG. 2, which describes the capabilities of that particular device to participate in workflow applications. The DPS 250 of a device is generally provided by the device's manufacturer or designers of the device's workflow application. Identical devices generally have identical DPSs. The DPS 250 specifies how the device can communicate with the workflow application. For example, messaging capabilities may include communication protocols that can be used between the device 100 and the workflow application 200, message size limit of messages sent between the device 100 and the workflow application 200, specification of message destination information (i.e., Uniform Resource Locator (URL) for networked device, e-mail address for Simple Mail Transfer Protocol (SMTP)), encoding requirements and other specifications generally required to transmit messages. Furthermore, specification of how a device outputs (i.e., name/value text pairs, binary data and text references to it) may be included in a message from the device 100 to the workflow application 200, or vice versa. In addition, the DPS 250 specifies the user interface 110 or operation capabilities 120 of the device 100 (or both), and memory 130 capabilities of the device 100. The DPS 250 is human readable and functions to allow builders of workflow applications to understand how a device 100 can participate in the workflow application 200. The DPS 250 describes, for example, how the workflow can communicate with the workflow application (i.e., transmission protocols).

Accordingly, the user interface 110 capabilities, for example, describe the user interface layout design capabilities (i.e., available design compositions for rendering the user interface during participation in the workflow application), user interface component capabilities (i.e., which user interface components can be presented to the user), or the like. The operations capabilities 120, for example, describe which input, output and triggering capabilities the device has, and how outputs from the device 100 to the workflow application 200 can be represented (i.e., name/value text pairs). In addition, the device output capabilities for the workflow application 200 may include identification of outputs from the user interface 110 that can be sent to the workflow application 200, identification of device operations 120 that can be sent to the workflow application 200, or the like.

Figure 3:
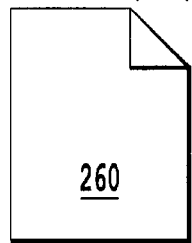
FIG. 3 shows a Device Participation Language (DPL)

The DPS 250 is translated into machine readable language called Device Participation Language (DPL) 260, shown in FIG. 3. The DPL 260 is specific to a particular device and specifies how message content is to be communicated between a device 100 and a workflow application 200. DPL 260 is a specification language with syntax, semantic constraints and content defined such that information can be shared among, and interpreted by, computers (i.e., devices, servers, or the like). DPL's language specifications embody the specifications and capabilities of the DPS 250 in the specification language form. The DPL 260 conforms to the DPS 250 and represents the message interface between the device 100 and the workflow application 200. The DPL 260 may describe all possible messages that may be sent to the device 100 and how these messages may be constructed. DPL 260 may be similar in concept to existing specification languages such as Web Service Description Language (WSDL) and Security Assertion Mark-up Language (SAML), but differs in its particular specifications. The DPL 260 may be an implementation of commonly used machine readable languages such as, but not limited to, Extensible Markup Language (XML) or Javascript Object Notation (JSON), or any machine understandable ontology language created for a computer system.

Figure 4:
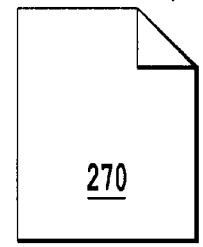
FIG. 4 shows a Device Participation Instruction (DPI)

An instruction written in DPL 260 and conforming to the DPS 250 is known as a Device Participation Instruction (DPI) 270, shown in FIG. 4. The DPI 270 content instructs the device 100 on how to render its state, such as the user interface 110 or various operations, in terms of the device's participation in the workflow application 200. In other words, the DPI 270 represents a device state that corresponds to a particular workflow state in the workflow application 200. The DPI 270 embodies instructions to the device 100 representing user interface 110 capabilities, device operation 120 capabilities, device outputs for the workflow application 200, or the like. In addition, the DPI 270 may hold workflow application 200 generated data that is incorporated into DPIs 270 that represent device capabilities 120. For example, the name of a current workflow step is generated by the workflow application 200 and is incorporated in the user interface instruction elements of DPI 270 such that the name of the workflow step appears on the user interface 110. The device state translator 270 may be a software component of the workflow application 200 which translates the workflow state into the DPI 270 which is sent to the device 100. As an example, the relation between the DPL 260 and the DPI 270 is similar to the relationship between WSDL and Simple Object Access Protocol (SOAP) messages, in the context of Service Oriented Architecture (SOA) or HyperText Markup Language (HTML) specifications and the HTML source code of a particular web page instance. As a result, all of the functionalities of a device may be explored by the DPS 250, the DPL 260, and the DPI 270.

Figure 5:
FIG. 5 shows a device output.

FIG. 5 shows a device output 280 which is sent from the device 100 to the workflow application 200. The device output 280 becomes input to the state machine engine 210 of the workflow application 200. The state machine engine 210 uses the device output 280 and its state to operate on workflow application 200 components following the logic of the state machine 210. A device output 280 may be information generated from one or more device operation(s), information passed by and copied from the previous DPI 270, or information entered by the user in the user interface 110. The device output 280 may be written in any protocol that is understood by the workflow application 200 and specified in the DPS 250.

A device 100 may participate in a workflow application 200 when the device 100 (with the aforementioned device components) can communicate with the workflow application 200 (with the aforementioned workflow components) and the workflow state engine 210. With the features of the present disclosure, multiple devices may communicate with a single workflow application. Multiple devices may be devices of the same type (i.e., scanners, blood sugar monitors, table PCs, cameras, or the like), may include a combination of different types of devices, or may involve a single device. A device may be physically housed on the workflow application component or more typically be distributed across a network.

Figure 6:
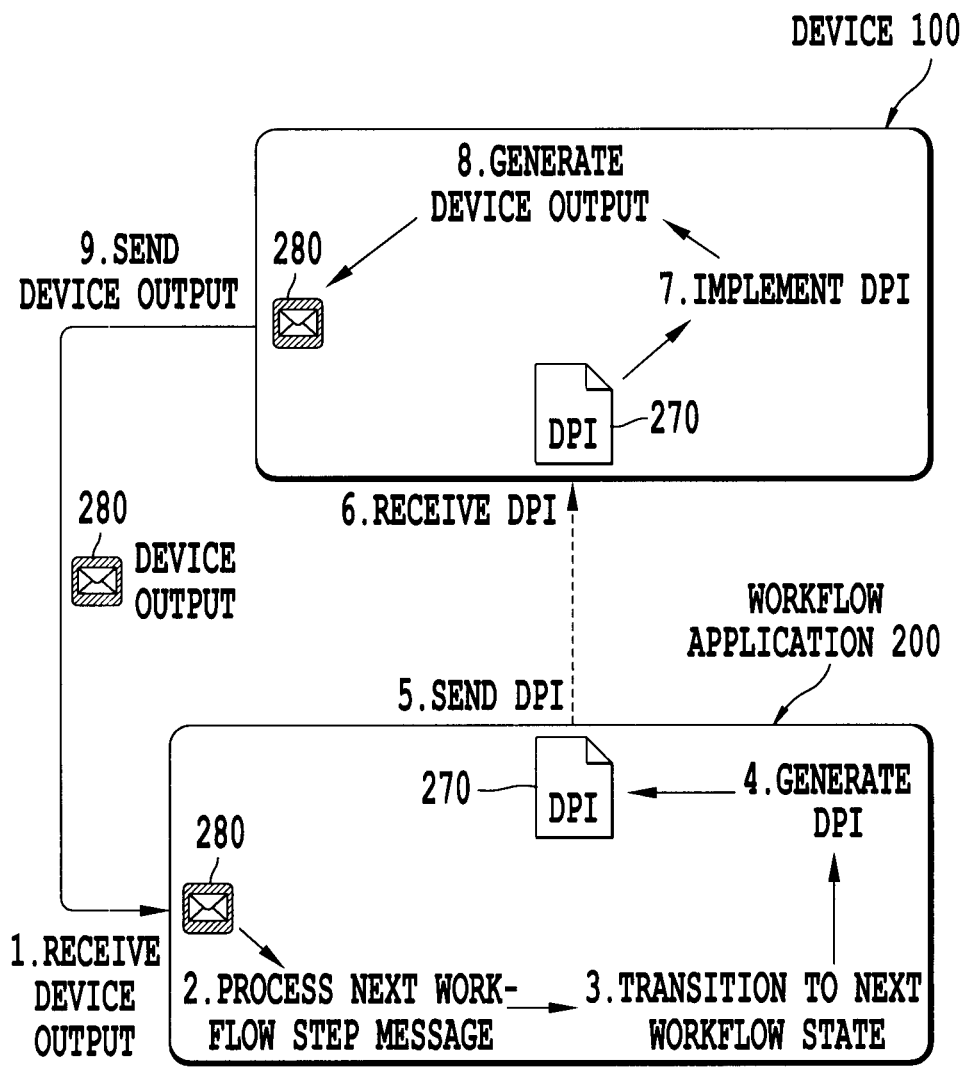
FIG. 6 shows a communication between a device and a workflow application.
Figure 7:
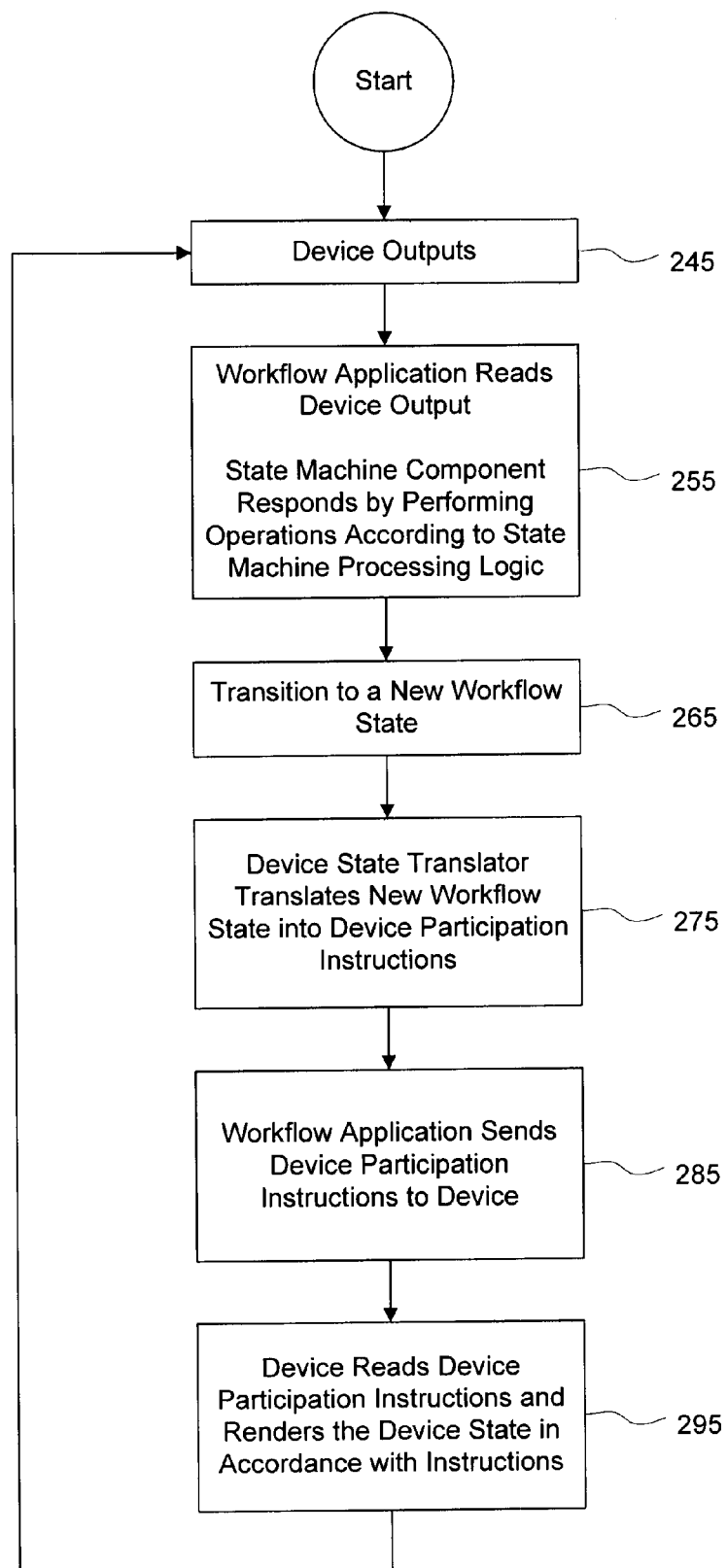
FIG. 7 is a flow diagram of the embodiment of FIG. 6.

FIG. 6 shows a communication between a device 100 and a workflow application 200 during one step of a workflow. FIG. 7 is a flow diagram outlining the steps of the communication between the device 100 and the workflow application 200 of FIG. 6.

First, a device 100 outputs (step 245), and the output 280 is received by the workflow application 200. Such output may be information generated from one or more device operations, information passed by and copied from the previous DPI 270, or information entered by the user in the user interface 110. Next, in step 255, the workflow application 200 reads the device output 280. The state machine 210 component of the workflow application 200 responds by performing operations according to the state machine processing logic. In step 265, the result of the operations performed by the state machine processing logic transitions the process to a new workflow state. Next, in step 275, the device state translator 240 translates the new workflow state into the DPI 270. The DPI 270 instructs the device 100 on how to render the device state for the new workflow state. In step 285, the DPI 270 is next sent to the device 100 in accordance with the device's DPS 250.

The aforementioned translation may be achieved by any conventional software procedure. For example, an embodiment of the present disclosure may use the same state-to-instruction technique as used in an online banking application which converts a state (i.e., user bank account balance, user requested withdrawal amount exceeds balance, or the like) into an instruction to the browser to render a new page (instructions written in HTML, for example). This instruction may render a new page which notes that there are insufficient funds and prompts the user to retry using a withdrawal amount which is less than the stated balance. In other words, just as a state is converted into an HTML instruction in the above example, the workflow state in an embodiment of the present disclosure may be translated into a DPI 270.

When the device 100 receives the DPI 270, the device's workflow participation component 140 reads the DPI 270 and renders the device state in accordance with these instructions, at step 295. For example, the device 100 may render the device's user interface 110 or the device 100 may perform one or more of its operations. The user interface 110 may be rendered such that user interaction performs a device operation (e.g., scanning biometrics of a fingerprint), or the operation may occur in response to receipt of the DPI 270 (e.g., printing a document with no human interaction when the DPI 270 is received).

Next, the device 100 generates output that may be used by the workflow application 200. Such output may derive from the user interface 110, a device operation 120, content sent by and copied from the DPI 270, or any combination thereof. This output is generated as instructed in the DPI 270. Finally, the device 100 sends the device output 280 to the workflow application 200, and the device 100 participation in the workflow application 200 continues as the above steps are cycled repeatedly.

When the workflow state engine 210 determines that the device 100 participation has reached its terminal state in the workflow, either no DPI 270 is created by the workflow application 200, the next DPI 270 sent to the device 100 instructs the device 100 not to send output 280 back to the workflow application 200, or the DPI 270 instructs the device 100 to transition to the first workflow step in preparation for a new user. For example, a DPI 270 may instruct the device 100 a) to render a user interface message to the user that the workflow is completed and b) to transition to the first workflow step after 10 seconds of displaying the message in (a) so that a new user may perform the workflow.

Figure 8:
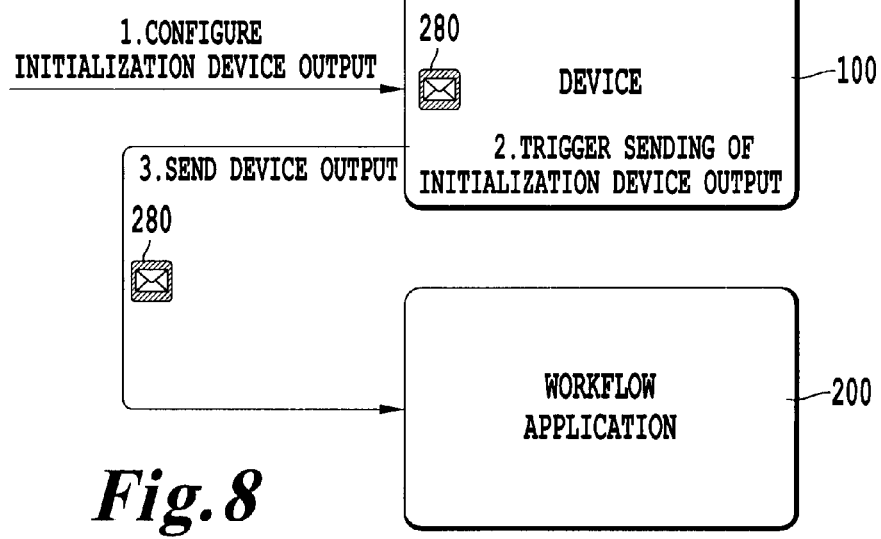
FIG. 8 shows an embodiment of a starting stage of a workflow interaction between a device and a workflow application.

FIG. 8 shows an embodiment of the starting stage of a workflow interaction between a device 100 and a workflow application 200. In this embodiment, the device 100 is configured to initialize its participation in the workflow application 200. Furthermore, initialization data is configured in the device 100 before any communication is attempted. This may be accomplished, for example, manually, remotely via a browser-based configuration tool, via the workflow application 200 with a configuration component, or the like.

As shown in FIG. 8, a trigger sends the initialization data to the workflow application 200. The trigger mechanism can be the device start-up, its workflow application component initialization, a timer within the device 100 set to send the message at a specified time, or other additional alternative mechanisms. After the initialization device output 280 is sent to the workflow application 200, the latter responds, as noted above with regard to the discussion of FIG. 6, with a DPI 270 instructing the device 100 how to initialize its state (i.e., to present a login screen).

In another embodiment, the workflow interaction between the device 100 and the workflow application 200 may be started by having first communication by the workflow application 200, whereby the workflow application 200 sends an initialization DPI 270 to the device 100, and then the sequence may continue as discussed above in FIG. 6.

Figure 9:
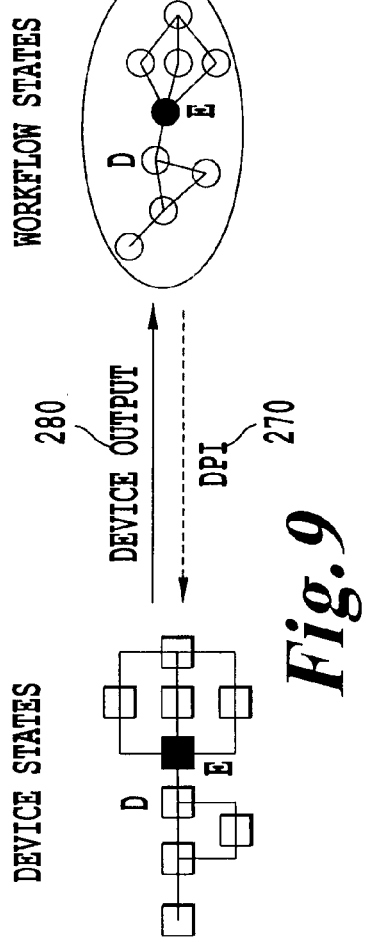
FIG. 9 shows a sequence of workflow steps between a device and a workflow application.

FIG. 9 shows how two steps (represented by "D" and "E") within a full sequence of workflow steps occur via interactions between a device 100 and a workflow application 200. The interactions consist of the device output 280 and the DPI 270, which is sent back to the device 100 by the workflow application 200. The device 100 sends the device output 280 to the workflow application 200 which uses its content to transition to a new state. This new state is then translated by the device state translator 240 to a corresponding device state represented in the DPI 270. As noted above, the device 100 is blind in that it receives and sends instructions based on what the workflow application instructs. Thus, the device 100 does not have knowledge of workflow state or state transition decisions because the device 100 renders itself according to the DPI 270, which is sent by the workflow application 200. Furthermore, the device 100 does not make workflow decisions and does not store or operate workflow executable code. The device 100 is simply instructed repeatedly how to render its state and instructed which information to send back to the workflow application 200. In addition, the sending of device output 280 may or may not involve human interaction.

Figure 10:
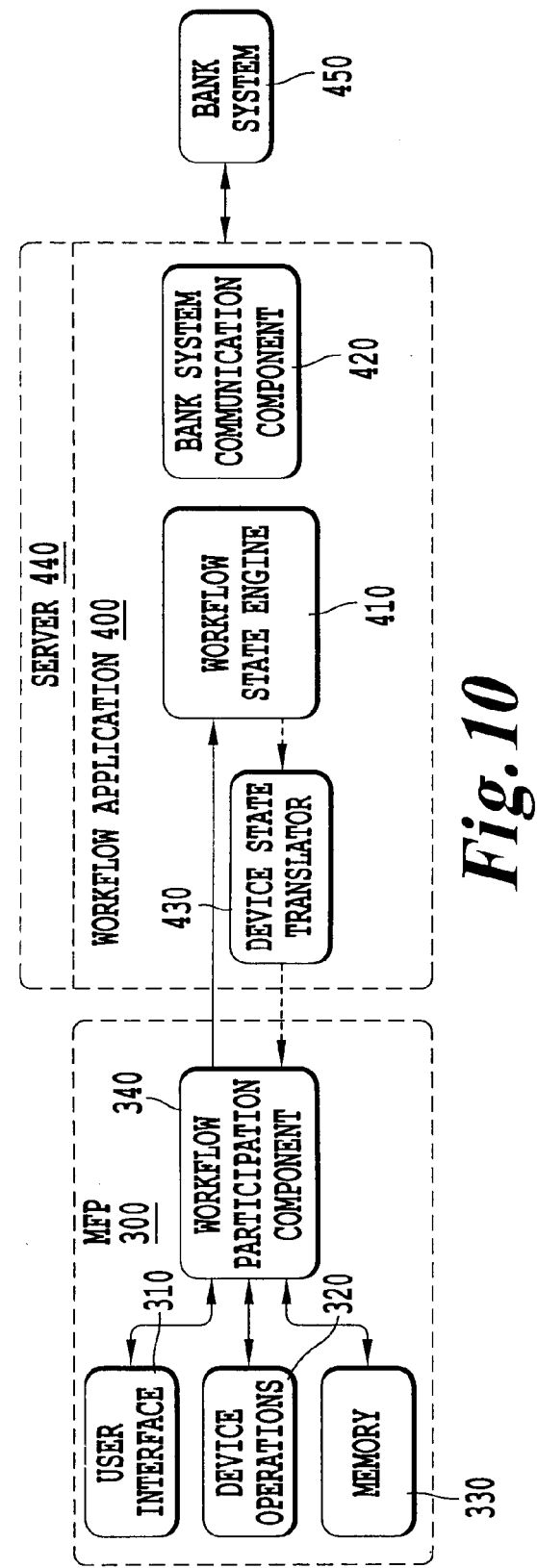
FIG. 10 shows an example of an embodiment of the present disclosure.

FIG. 10 illustrates an example of an embodiment of the present disclosure. In this particular workflow example, a Multi Function Peripheral (MFP) 300 or Multi Function Device (MFD) includes a user interface panel 310, scanning, printing capabilities, Management Information Base (MIB) database operation (which are part of the device operations 320), memory 330, and a workflow participation component 340. The workflow application 400, which in this example is embodied on a server 440, includes a workflow state engine 410, a bank system communication component 420 (which communicates with the bank system 450), and a device state translator 430. The workflow application 400 has its own specific implementation details. The MFP 300 needs no knowledge of these workflow implementation details because it only responds to specific DPIs, written in the DPL that each side (MFP 300 and workflow application 400) understands, and conforming to the DPS which describes, in detail, the capabilities of the MFP 300 in participating in workflows. Note, in this case, the capabilities include user interface, scanning, printing and supporting specifications, such as double-sided printing. The workflow application 400 understands how the MFP 300 carries information (i.e., simple name/value pairs in HTTP request URL, or XML data structures in the HTTP request body), and how to process that information (i.e., what each name/value pair represents).

In the example of FIG. 10, which parallels the steps of FIG. 7, a user creates a bank account from an MFP 300. First, at the MFP 300, a DPI is implemented after the MFP 300 is booted by rendering a user interface 310 panel for user. A device output is generated by the user entering the login information. The device output is sent when the user presses the submit button to submit the login information.

Next, the workflow application 400 processes the message sent as the device output, by reading the user login information and authenticating the user. The transition to the next workflow step occurs after authentication is successful. A DPI is next generated by translating the new workflow state into instructions for the next step of scanning a completed bank account form. The generated DPI is sent back to the MFP 300.

The MFP 300 receives and implements the DPI by rendering a panel and preparing the MFP 300 for scanning. The MFP 300, next, generates a device output when the user scans the document, and the document is converted to a digital format. The MFP 300 then sends the generated device output which, in this case, is the scanned digital document, to the workflow application 400.

The workflow application 400, located on the server 440, processes the message, or device output, by receiving the digital document, extracting information, sending the extracted information to the bank system 450, and receiving a response from the bank system 450 stating that the account has been successfully created. The transition to the next workflow step occurs after the confirmation that the account has been successfully created. A DPI is next generated by generating instructions for the next step of printing the "Terms and Conditions" of the account. The generated DPI is sent back to the MFP 300. Note that the DPI includes the digital files which may be printed at the MFP 300.

The MFP 300 receives and implements the DPI by changing, for example, the print settings to double-sided, black and white printing. The digital document is then printed. After printing, a device output is generated verifying that the printing was successful. The verification status is next sent to the workflow application 400, as the device output.

Next, the workflow application 400 processes the message, or device output. Since the verification status indicated that printing was successful, the workflow session for the current logged in user stops. At this point there is no transition to the next workflow step, and thus the workflow process is terminated.

In summarizing the above example of FIG. 10, a user logs into the MFP 300 using the MFP's user interface 310 panel. Next, the workflow application 400 authenticates the user. The user then follows the directions on the MFP's user interface 310 panel to scan a completed bank account application form, and scans the form. The workflow application 400 extracts data from the bank account application form, sends the data to the bank system 450, and the bank system 450 creates an account. The bank system 450 returns a digital "Terms and Conditions" document, which the workflow application 400 sends to the MFP 300. Lastly, the MFP 300 prints the "Terms and Conditions" document (without the need for human interaction) and returns to the login screen.

The example of FIG. 10, in which a user creates a bank account from an MFP, differs in functionality from a user creating a bank account via WBWA embodied on any device capable of browsing the Internet, such as a smart phone, tablet computer, or desktop computer. The MFP, for example, exposes a larger number of features to the workflow than a WBWA. Such features include scanning, printing, and changing internal configurations, such as print settings. The MFP may respond to a workflow application without user intervention (i.e., changing printer settings and then printing with no user intervention), whereas WBWA only presents content to the user, inputs to complete, and/or buttons to press.

Furthermore, if a smart phone participated in a workflow using the embodiments of the present disclosure, the features of the present disclosure would enable the smart phone to participate in diverse workflows involving the phone's full feature list (i.e., camera, contact list, settings, microphone, speaker, or the like). Accordingly, for example, a workflow application may generate a DPI which requests the smart phone's camera to take a picture. Similarly, a workflow application may generate a DPI which requests the smart phone's contact list to be sent to the workflow application. The participation of such features may be accomplished with no human intervention over numerous workflow steps.

The features of the present disclosure may be applied to a universal array of systems. In an example of another embodiment of the present disclosure, a chemical sensor communicates over a network. The chemical sensor may have numerous features that may participate in a workflow application. For example, the sensor may sense a range of chemicals, produce a sound, or some type of communication such as a green, orange, and/or red light(s). The chemical sensor may sense a chemical above a certain threshold concentration, and send the chemical name and concentration to the workflow application. The workflow application returns instructions to a) increase the frequency of sensing the chemical, b) increase the sensitivity of the sensing, and c) apply these instructions to two other chemicals. The sensor follows the workflow application instructions, and reports the new results back to the workflow application. The workflow application sends e-mail alerts to authorities, returns instructions to the sensor to a) continue at the previous level, b) light the orange light, and c) produce an audible signal, such as a beep sound, at a specified frequency and/or amplitude. The workflow may then continue with other possible workflow paths and for any amount of duration.

The features of the present disclosure may also be applied to the healthcare field. For example, nurses using tablet computers, medical devices monitoring patients, and scanners and printers handling documents may all participate in the same workflow application. Each of these devices may involve workflow steps that are isolated to a particular device or that may be shared among some, or all, of the devices.

As previously mentioned, the present disclosure creates a universality among different participating devices (i.e., MFPs, chemical sensors, tablet computers, artificial heart pacemakers, or the like). With respect to the aforementioned examples, the MFP and the sensor may each participate in any workflow application (with no knowledge of the application) when the device implements DPIs (written in DPL and specified in DPS) and sends output (as instructed by the DPI) to the workflow application. A device may communicate with a workflow application by using any protocol. The workflow application can translate workflow steps into DPIs and can communicate with the device according to the protocol the device uses, which is specified in the device's DPS. As a result, any device that specifies DPS and DPL can participate in any workflow application that is written to conform to the device's DPS. Accordingly, a device needs no knowledge of technology details of a workflow application (i.e., operating system, type of server, workflow knowledge whether other systems, such as banks, are involved, or the like), since the device simply responds to DPIs. A device is thus capable of participating in an unlimited number of workflow applications under systems of varying technology.

A device participating in any particular workflow application may continue to operate with no changes to the device, even if the workflow application is changed significantly. Following from the example of FIG. 10, the workflow application 400 may be changed from a "Create Bank Account" application to a "Book and Print Airline Ticket" application, without any changes to the MFP 300.

Figure 11:
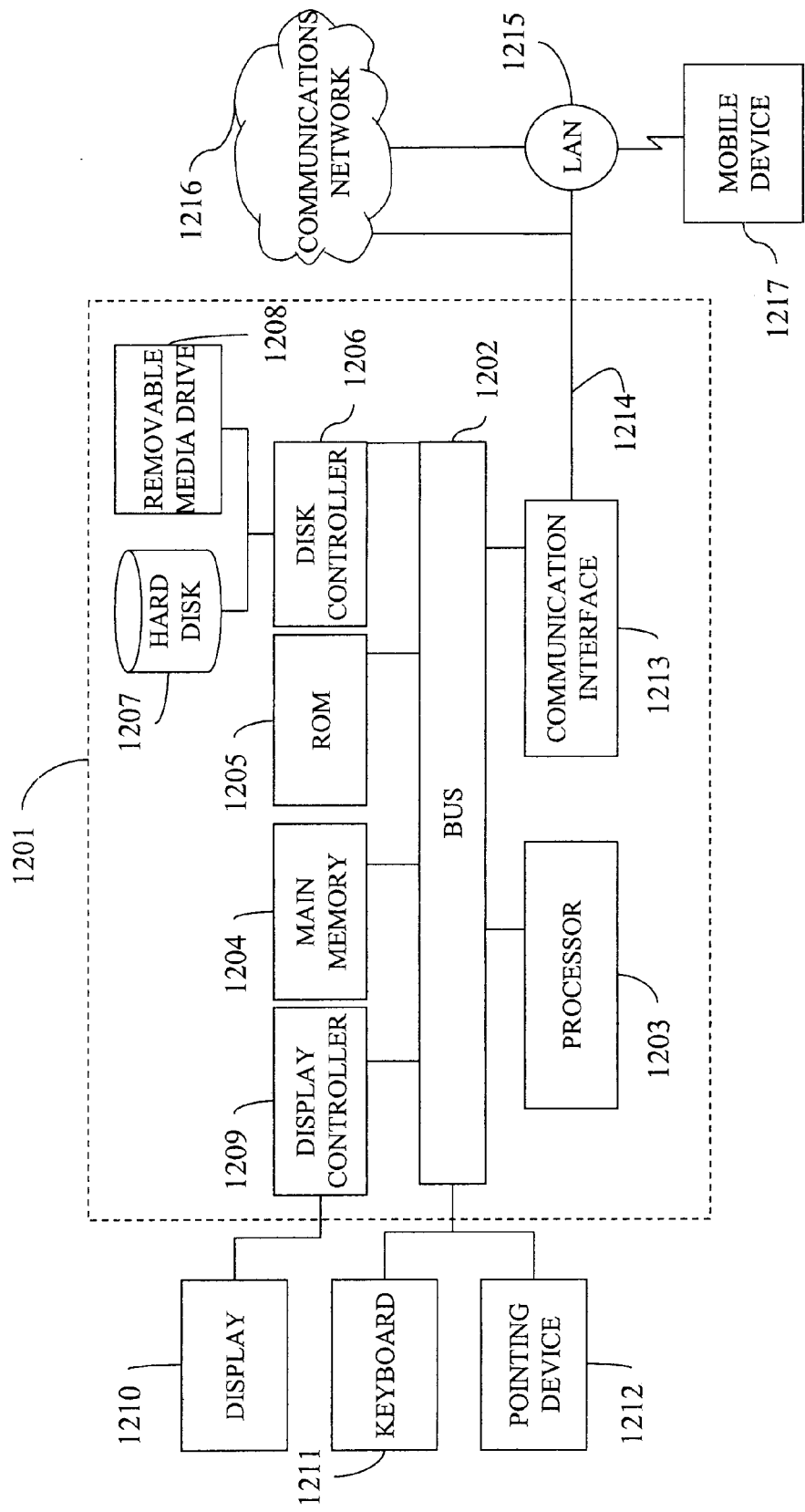
FIG. 11 illustrates a computer system upon which an embodiment of the present disclosure may be implemented.

FIG. 11 illustrates a computer system 1201, device, or MFP upon which an embodiment of the present disclosure may be implemented. The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a touch panel display or a liquid crystal display (LCD), for displaying information to a computer user. The user interface 110 of FIG. 1, for example, may be displayed on the display 1210. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, other embodiments may include the use of a carrier wave (described below), or any other medium from which a computer can read. Other embodiments may include instructions according to the teachings of the present disclosure in a signal or carrier wave.

Stored on any one or on a combination of computer readable media, the present disclosure includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory. A modem local to the computer system 1201 may receive the data. The data may then be placed on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A system for communicating between an apparatus hosting a workflow application and a device, the system comprising:
 a processor, at the apparatus, configured to
  extract information from a first device output, received from the device,
  send, via a communication unit, the extracted information to an external apparatus, the external apparatus, the device, and the apparatus being different from and external to one another, and transition to a workflow step in response to receiving a response from the external apparatus, a workflow translator, at the apparatus, configured to translate the workflow step into a device instruction, the device instruction being based on device specifications and instructing the device to modify configuration parameters previously set in the device and to perform a function with the modified configuration parameters at the device, and configured to send the device instruction from a workflow engine that contains the workflow step to the device; and the workflow engine, which is at the apparatus and is configured to directly receive a second device output from the device, the second device output corresponding to the function instructed by the device instruction and being different from the first device output.

2. The system of claim 1, wherein the device specifications include all of the functional capabilities of the device, and the device instruction is configured to perform any function according to the device specifications.

3. The system of claim 1, wherein the first device output is at least one of generated from the device, copied from a previous device instruction, and information entered via a user interface.

4. The system of claim 1, wherein the workflow translator, at the apparatus, is configured to translate the device instruction into a machine-readable language of the device.

5. The system of claim 1, wherein the device is at least one of a chemical sensor, a medical device, an electrical appliance, a tablet personal computer, and a smart phone.

6. The system of claim 1, wherein the device contains a user interface which receives, as input, at least one of a text data, voice data, chemical data, and biometric data.

7. The system of claim 1, wherein the device processes the device instruction and performs the function based on the device instruction.

8. The system of claim 1, wherein the processor, at the apparatus, is configured to process a third device output, received from a second device, and to transition to another workflow step, the workflow translator, at the apparatus, is configured to translate the another workflow step into a second device instruction, the second device instruction being based on second device specifications and instructing the second device to perform a second function, and is configured to send the second device instruction from the workflow engine to the second device, and the workflow engine is configured to receive a fourth device output from the second device, the fourth device output corresponding to a result of the second function instructed by the second device instruction and being different from the third device output.

9. The system of claim 1, wherein the communication unit is configured to communicate a part of the second device output to the external apparatus.

10. An apparatus hosting an application participating in a workflow communication, the apparatus comprising:

a processor configured to extract information from a first device output, received from a device, send, via a communication unit, the extracted information to an external apparatus, the external apparatus, the device, and the apparatus being different from and external to one another, and generate a workflow step in response to receiving a response from the external apparatus, a workflow translator configured to translate the workflow step into a device instruction, the device instruction being based on device specifications and instructing the device to modify configuration parameters previously set in the device and to perform a function with the modified configuration parameters at the device, and configured to send the device instruction from a workflow engine that contains the workflow step to the device; and the workflow engine, which is at the apparatus and is configured to directly receive feedback from the device, the feedback corresponding to the device instruction, wherein the processor is configured to process the feedback and update the workflow communication based on the processed feedback.

11. The apparatus of claim 10, wherein the processor is configured to generate a second workflow step, the workflow translator is configured to translate the second workflow step into a second device instruction, the second device instruction being based on second device specifications and instructing a second device to perform a second function, and is configured to send the second device instruction from the workflow engine to the second device, the workflow engine is configured to receive second feedback from the second device, the second feedback corresponding to the second device instruction, and the processor is configured to process the second feedback and update the workflow communication based on the processed second feedback.

12. The apparatus of claim 10, wherein the communication unit is configured to communicate a part of the feedback to the external apparatus.

13. A non-transitory computer-readable storage medium including computer executable instructions for an application participating in a workflow communication, wherein the instructions, when executed by a computer, cause the computer to perform a method comprising:

extracting, at an apparatus, information from a first device output, received from a device;

sending, at the apparatus, the extracted information to an external apparatus, the external apparatus, the device, and the apparatus being different from and external to one another;

generating a workflow step in response to receiving a response from the external apparatus;

translating, by a workflow translator at the apparatus, the workflow step into a device instruction, the device instruction being based on device specifications and instructing the device to modify configuration parameters previously set in the device and to perform a function with the modified configuration parameters at the device;

sending, by the workflow translator, the device instruction from a workflow engine that contains the workflow step to the device;

receiving, directly by the workflow engine, which is at the apparatus, feedback from the device, the feedback corresponding to the device instruction; and processing the feedback and updating the workflow communication based on the processed feedback.

14. The system of claim 1, wherein the apparatus hosting the workflow application corresponds to a server, and the device corresponds to a Multi Function Peripheral (MFP).

15. The system of claim 1, wherein the configuration parameters correspond to parameters of printing a document.

16. The system of claim 1, wherein the first device output is generated from the device, copied from a previous device instruction, and includes information entered via a user interface.

* * * * *